July 14, 1925.
A. L. BAUSMAN
1,546,000
METHOD AND APPARATUS FOR DECORATING CONFECTIONS
Filed Aug. 20, 1921     3 Sheets-Sheet 1
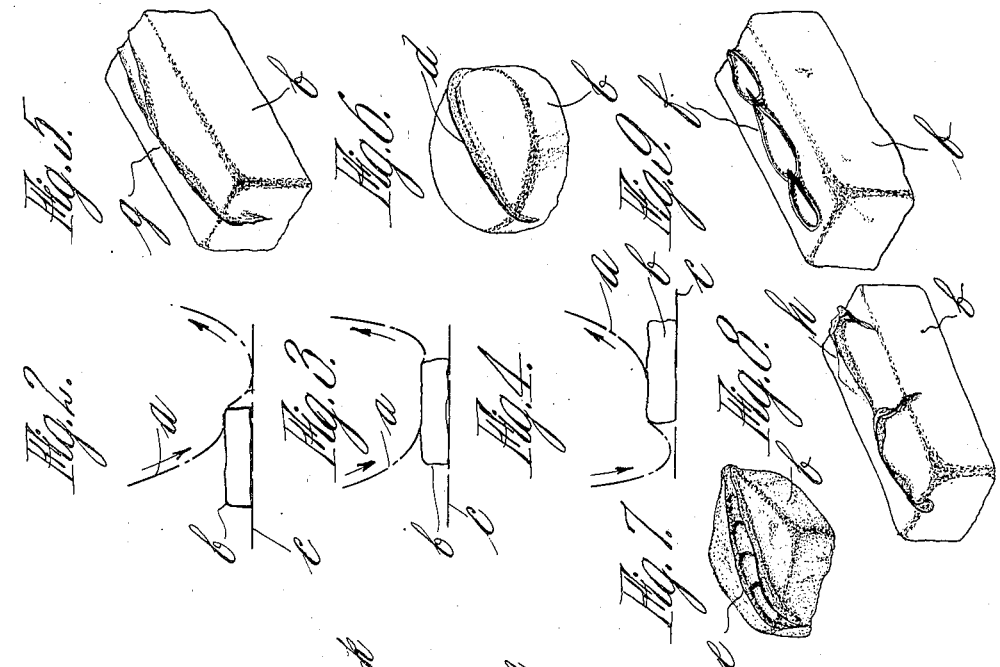
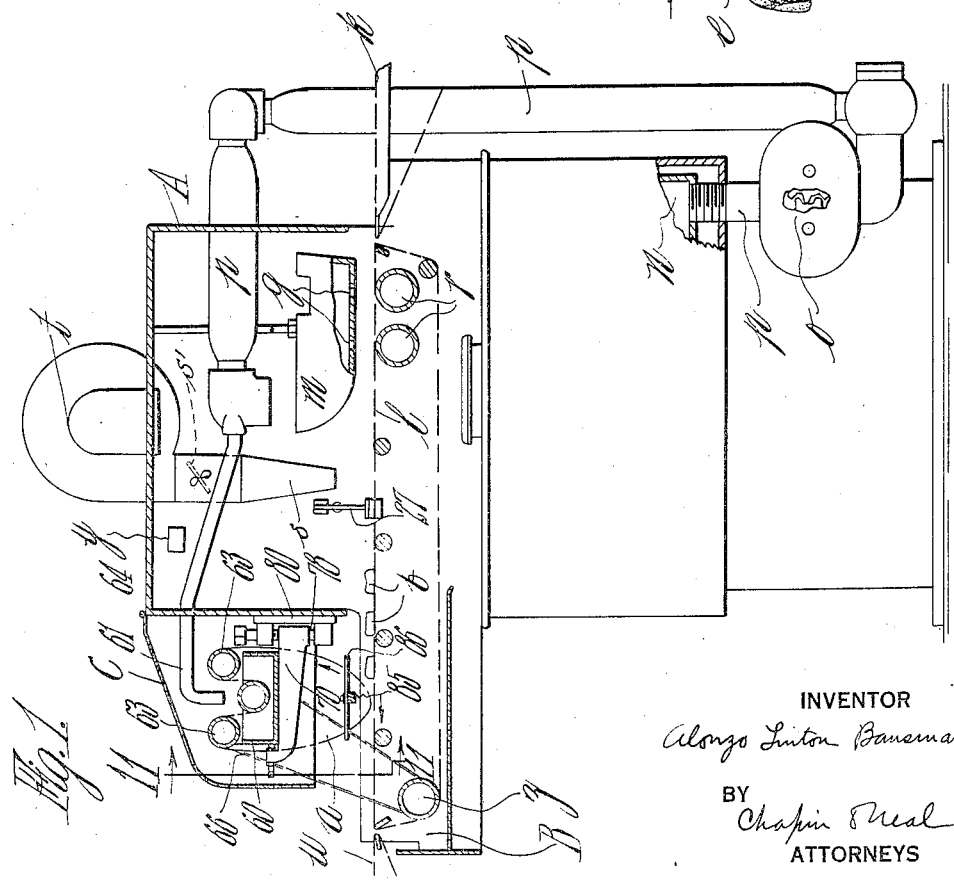
INVENTOR
Alonzo Linton Bausman
BY
Chapin Neal
ATTORNEYS

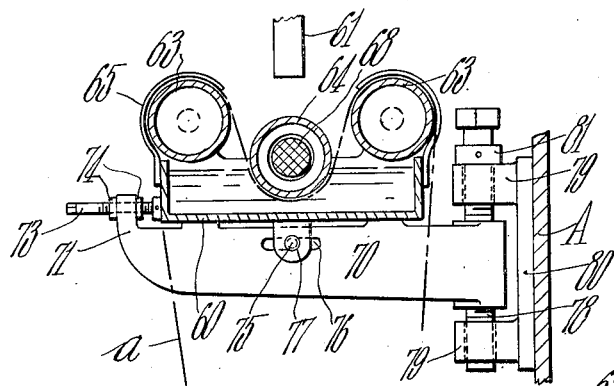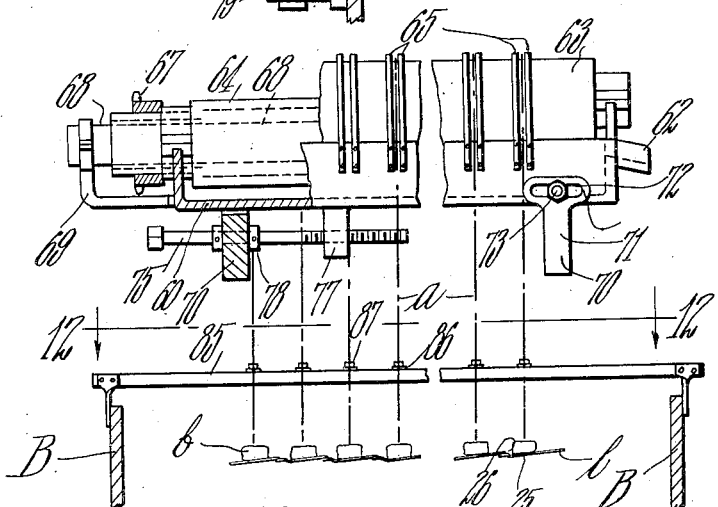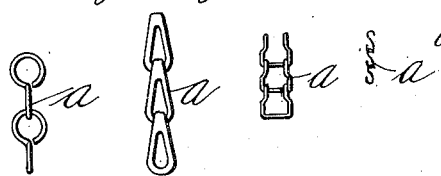

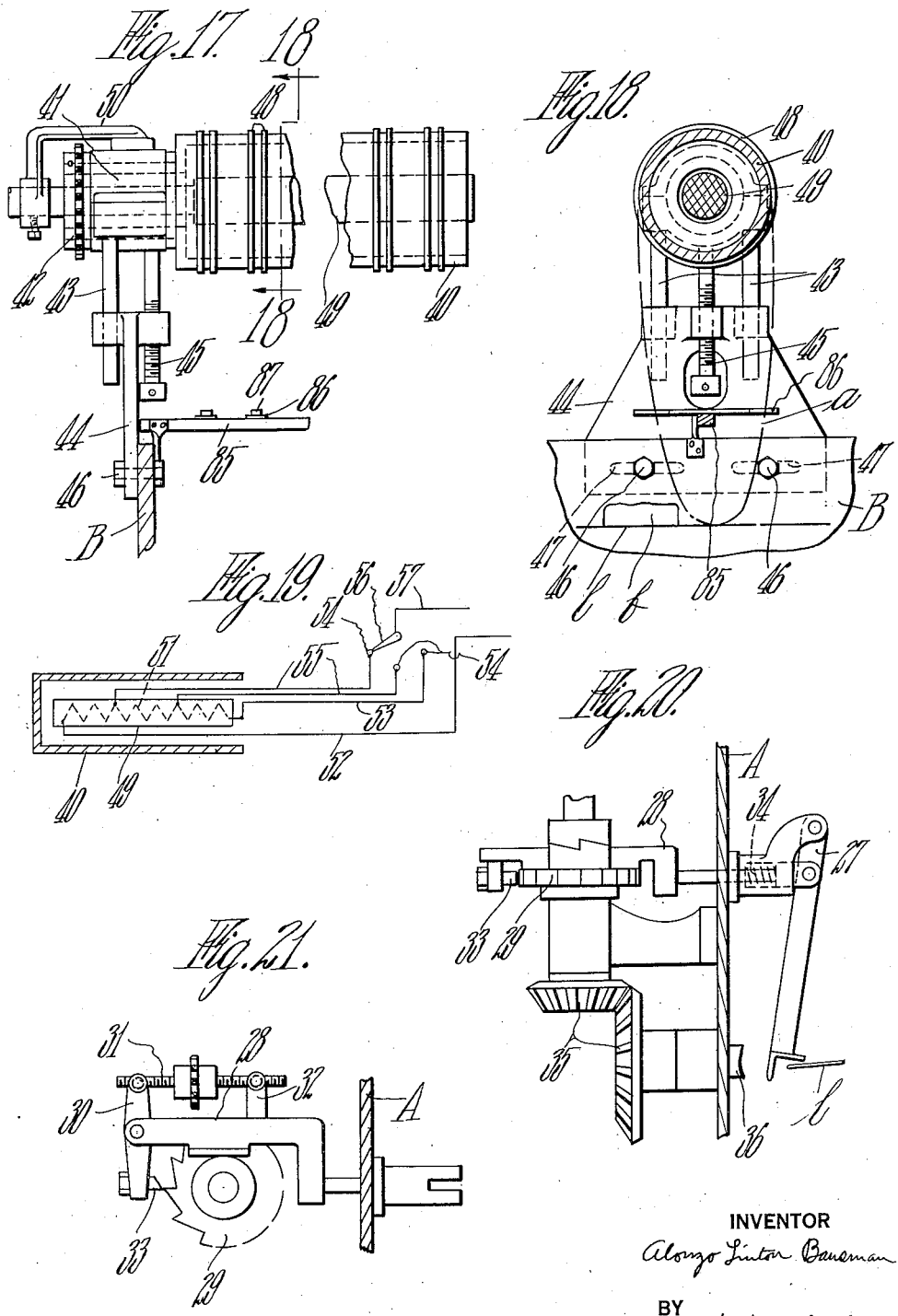

Patented July 14, 1925.

1,546,000

UNITED STATES PATENT OFFICE.

ALONZO LINTON BAUSMAN, OF SPRINGFIELD, MASSACHUSETTS.

METHOD AND APPARATUS FOR DECORATING CONFECTIONS.

Application filed August 20, 1921. Serial No. 493,850.

*To all whom it may concern:*

Be it known that I, ALONZO LINTON BAUSMAN, a citizen of the United States, residing at Springfield, in the county of Hampden and State of Massachusetts, have invented new and useful Improvements in Methods and Apparatus for Decorating Confections, of which the following is a specification.

This invention relates to a method of, and apparatus for, decorating confections and the like.

Decoration of confections, as heretofore practiced, generally has involved the depositing of coating material upon the confections or the working of their coating by dragging spoons, or other contacting strokers, therethrough, and variations in the design of the decorations have usually been effected by movement of the depositing members, or the contacting strokers, in various paths.

The method of this invention makes use of a flexible series of decorating members as one flexible decorating unit comprising a series of members having patterns or designs thereon and preferably, although not necessarily, the unit comprises a series of patterns connected into chain-like formation. The method consists in applying the series of members to the confections much in the same manner as the endless traction belt of a tractor lays itself over the obstructions and inequalities of the ground upon which it travels, and, the coatings or outer portions of the confections having been rendered plastic in any suitable manner, decorative designs are produced on the confections by the tracks left by the pattern members after they have "walked" over the plastic coating. The latter adhering to the pattern members, is drawn out to some extent, when the pattern members are removed, forming raised ornamentations on the confections.

According to this method, the designs of the decorations produced are based upon the pattern or design of the decorating members and they are effected without a substantial dragging of the members over the confection although there may be some slip between the confection and the decorating members in the same sense as the feet slip when withdrawing them from plastic soil. Although the design of decoration is based upon the pattern of the decorating members, it is not necessarily an exact or even close reproduction thereof. Various degrees of departure from the design of the decorating members occur, according to the plasticity of the coating of the confection and in much the same manner as variations occur in footprints left in soils of various consistencies.

The method, in another of its aspects, involves the additional step of heating the decorating members prior to their contact with the confections. The heating of the pattern members may be utilized to render the outer portion of the confections plastic and workable and it is desirable, even when the confection is already in the desired plastic state, to heat the pattern members sufficiently so as not to chill the coating when it contacts therewith.

The method, in another of its aspects, involves the additional step of supplying to the flexible series of decorating members coating material, which is carried to the confections and mingled with their coating, and results in a variation or at least an intensification of the decorations over those otherwise produced.

Other important additional features of the method relate to the control of temperature conditions, such as the heating of the decorating members and the coating material,—both that sometimes supplied to the members and that used for coating the confections,—as well as the heating of the atmosphere in the regions in which the coating as well as the decorating operations are accomplished. All these factors contribute to control the plasticity of the material at the time when the decorations are produced and variation of one or more of them can be made use of to vary the designs of decorations produced from decorating members of any given design.

The method can be carried out by hand, but it is usually carried out by automatic mechanism and desirably, although not necessarily, in conjunction with a confectionery coating machine.

The method, while preferably used for decorating confections while their outer portions are soft enough to be workable, may also be used for ornamenting non-coated confections, as for example, by supplying coating material to the decorating members or by heating such members so as to soften the outer portion of the confection or by the use of both these schemes together.

The invention also has for an object to provide an apparatus for carrying out the method, characterized by a flexible, and preferably endless, series of pattern members mounted to travel in a loop path and extending into the path of the confections, together with means for effecting a relative longitudinal movement between the confections and pattern members, preferably at a speed substantially equal to the linear speed of the pattern members in their loop path.

Further objects relate to the provision of means for heating the pattern members, for supplying additional coating material thereto, and for guiding the members and the confections into proper engagement for the decorating operation.

Another object is to provide a machine for coating and decorating confections, having a suitable coating means and one or more decorating units of the type described, together with conveying means to carry the confections first to the coating means and then to the decorating units and mechanism for moving the coated confections on the conveying means into correct position for engagement by said units.

Another object of the invention is to provide means for adjusting the decorating units with relation to the confection support in any one or more of the following directions,—either toward and away from the latter, or transversely or longitudinally thereof.

Other objects and advantages will appear in the following description, taken with the illustrative embodiment of the invention in the accompanying drawings, and will be particularly pointed out in the annexed claims.

In the drawings,

Fig. 1 is an elevational view, partly in section, of a confectionery coating machine, embodying an apparatus for carrying out my method of decoration;

Figs. 2, 3, and 4 are diagrammatical views, illustrative of successive steps used in practicing the method;

Figs. 5 to 9, inclusive, are perspective views of confections showing some of the many styles of ornamentation that can be produced by the method;

Fig. 10 is an enlarged sectional elevational view of the supporting and driving mechanism for the flexible decorating units;

Fig. 11 is a cross-sectional view taken along the line 11—11 of Fig. 1, certain parts being broken away;

Fig. 12 is a sectional plan view taken on the line 12—12 of Fig. 11;

Figs. 13, 14, 15, and 16 are fragmentary plan views of a few of the various types of flexible series of pattern members which may be employed in practicing the method;

Fig. 17 is a fragmentary cross-sectional view, taken similarly to Fig. 11 and showing another form of supporting and driving mechanism for the flexible decorating units;

Fig. 18 is a cross-sectional view thereof taken on the line 18—18 of Fig. 17;

Fig. 19 is a diagrammatical view illustrative of the means for heating the decorating units;

Fig. 20 is an enlarged fragmentary cross-sectional view illustrative of a belt-tapping mechanism used, in connection with a belt such as is indicated in Fig. 11, to aline the confections properly for engagement with the decorating units; and Fig. 21 is a fragmentary top plan view of Fig. 20.

Referring to these drawings, and particularly to Figs. 2, 3, and 4, in carrying out the method a flexible unit, consisting of a series of decorating members conventionally indicated at $a$, is utilized. These flexible members may be variously constructed, as desired, and their construction will naturally depend upon the kind of work to be accomplished. As a representative example, the flexible unit may consist of a chain and chains are particularly advantageous for this purpose because their links may be made in a wide variety of shapes, a few of which are shown as examples in Figs. 13 to 16, inclusive. Aside from the more or less conventional types of chains shown in these figures, many others specially prepared for this purpose may be used, the links being bent up from wire, for example, into an endless variety of shapes. Flexible units, other than chains, may be employed in practicing the method, and the chains are preferred simply on account of the latitude that they afford for variations in designs.

In carrying out the method in the simplest manner, as by hand, the flexible unit $a$ is held by the operator with both hands so that a loop depends therefrom as indicated in Fig 2, and the loop and confections are moved longitudinally, the one relatively to the other. The operator may, for example, move this loop longitudinally into engagement with the confection $b$, while it rests stationary upon a support $c$, or the confections may be moved longitudinally as will later appear. The unit is then manipulated so that it will be progressively laid over the confection, or over that part thereof which is to be ornamented upon the relative longitudinal movement described. This manipulation consists essentially in moving the unit in its loop path and may be effected by raising one end of the loop of unit and at the same time lowering the other, as indicated by the arrows in Figs. 2 to 4. The unit when thus manipulated will be laid upon the confection progressively, working from its point of engagement near one end thereof toward the opposite end, as will be apparent from Fig. 3. On continuation of this operation, the unit is lifted from the confection progressively, beginning at its point of engagement on the confection and working toward the opposite end, as indicated in Fig. 4. The action of laying the flexible unit upon the confection may be likened to the action of the endless traction belt of a tractor in laying itself over the irregularities of the ground upon which it travels. The unit is made to walk over the fresh coating of the confections and leave its tracks. In thus laying the flexible unit $a$ upon the confection, each portion of the former engaged by the latter preferably remains in engagement therewith for a short interval, although of course the interval may be made very short and otherwise regulated as desired, according to the work to be accomplished. Also, the laying on of the flexible unit is preferably accomplished without any substantial dragging of the member longitudinally of the confection, which would cause a mark or decoration to be formed more in the manner of that effected by contacting strokers, although, as above set forth, a limited amount of slip may occur.

Assuming that the coating of the confection $b$, or the outer portion thereof in event the confection $b$ is not a coated one, is in a somewhat plastic condition, portions of this coating, or plastic substance, adhere to the patterns of flexible unit $a$ and, as the latter is lifted from the confection, these adhering portions are drawn up with it until they break away therefrom, forming raised ornamentations upon the confection. The ornamentations produced are, in a broad sense, based upon the design of the pattern members making up the unit $a$. That is, the design of these patterns is the controlling factor of the ornamentation although it does not actually follow that the ornamentations are exact or even close reproductions of the patterns. For example, the unit $a$, shown in Fig. 16, will, if the openings in its links are small enough, produce the straight plain ridge $d$ shown in Fig. 6. On the other hand, the ornamentations $e$ and $f$ (Figs. 7 and 9) are much more nearly reproductions of the pattern of the units by which they are produced, those shown at $e$ and $f$ being formed by chains like those shown in Figs. 15 and 14, respectively. Ornamentations like those shown at $g$ and $h$ are usually formed by chains, resembling that shown in Fig. 16 but having somewhat larger openings in its links.

The ornamentations formed, as above described, may be accentuated, and to some degree varied, by supplying to the flexible unit $a$ additional coating material, or the additional coating material may be used alone to form ornamentations on confections, the outer portions of which are no longer workable, or upon biscuits, cakes, and the like, which I intend to be included by the term "confections."

In thus decorating coated confections the control of every factor having any contributory effect on the plasticity of the coating of the confection is important. The temperature of the coating material and the surrounding atmosphere and the length of time elapsing between the coating and decorating operations all have an influence on the degree of plasticity of the coating of the confection at the time when it is decorated and variations of any one of these factors within limits will tend to vary the decorations produced. For these reasons, I prefer to heat the flexible series of decorating patterns, It is desirable, at least, to heat the patterns sufficiently so as not to chill the coating and interfere with its workability. It is even possible to form the decorations solely by the use of a series of heated pattern members which will soften those outer portions of the confection engaged sufficiently to allow the pattern members to leave their tracks. Generally, however, and especially with chocolate, too much heat, as well as too little heat, will tend to make the decorations inconspicuous.

In the preceding description, the confection has been considered as stationary while the flexible unit $a$ is manipulated by hand to effect the decorations. The latter are usually formed shortly after the confections have been coated and usually while the latter are in motion. Also the flexible decorating unit $a$ is preferably automatically moved. Thus, the confections $b$ may be carried upon the belt $l$ of a confectionery coating machine, as illustrated in Fig. 1, and be engaged by the unit $a$ which is moved by automatic mechanism in the direction of the arrows, and preferably at a linear speed substantially equal to that of belt $l$. The unit $a$ will be rolled upon the confections and caused to "walk" over them leaving tracks much as heretofore described and similar ornamentations will be effected.

The apparatus for carrying out the method automatically will now be described. In its simplest form, the apparatus consists merely of a supporting and driving means for moving one or more of the flexible units $a$ in a loop path, together with a support for the confections $b$ and means for producing a relative longitudinal movement between the first-named means and said support in order to feed the confections to the flexible decorating units. It is generally, however, desired to ornament the confections shortly after they have been coated and, preferably therefore, although not necessarily, the decorating apparatus is applied to, or incorporated into, a confectionery coating machine.

Obviously, various types of coating machines may be used, as desired, and that shown in Fig. 1 is given merely by way of illustrative example of one suitable type. The particular machine shown is of the general type shown in my prior U. S. Letters Patent No. 1,323,948, granted December 2, 1919. For the present purposes, a brief description of the main elements of the machine will suffice, reference being made to the above-named patent for a more complete disclosure. The confections $b$ are fed into the casing A of the machine by a belt $k$ and are automatically transferred to a pervious coating belt, such as a wire belt $l$, by which they are carried beneath a shower-pan $m$. Chocolate, or other coating material, maintained mixed and at proper temperature in a jacketed tank $n$, is supplied by a pump $o$, through suitable pipe connections $p$ to the shower-pan $m$ and issues through slots $q$ in the latter in a shower upon the belt $l$ and the confections $b$ carried thereby thus enveloping the latter. Excess coating falls through the belt $l$ into the tank $n$. Some of the excess coating is taken up by rolls $r$ and applied to the bottoms of confections $b$ in the known manner. The confections, after coating, are subjected to a blast of air issuing from a nozzle $s$ from a fan $t$ and the blast is regulable by a damper $s'$, whereby various degrees of the applied coating may be removed, thus enabling the thickness of coating to be controlled. The confections are then carried along beneath the decorating apparatus and finally delivered upon the belt $u$, which usually carries them to the cold room. Suitable heating means, such as an electrical heating unit, exemplified conventionally at $y$, are provided to control the temperature of the atmosphere in the region in which the coating is accomplished.

Usually, for each row of confections carried by belt $l$, there is provided a flexible decorating unit $a$ and it is then desirable that the rows of confections on belt $l$ be alined with their respective units. This alining may be accomplished in various ways and as an illustrative example of one suitable way, the following arrangement is used. The belt $l$ (see Fig. 11) is made in the fashion disclosed in U. S. Letters Patent No. 1,009,670, granted November 21, 1911, to T. & D. Kihlgren. It includes a transverse series of portions 25, which are inclined to the horizontal and connected together by shoulders 26. By tapping the belt $l$ along one side edge (the left as viewed in Fig. 11) the confections are caused to slide down the inclined portions 25 and bring up against the shoulders 26. When thus positioned, they are in line with their respective decorating units $a$.

As an example of a means to effect the tapping of the belt $l$, a lever 27 is pivoted at one end to casing A (see Fig. 20) with its lower end disposed adjacent to belt $l$. A member 28, mounted in casing A to slide horizontally, is pivotally connected at one end to lever 27. Near its other end, this member rests upon the face of a ratchet-wheel 29, and at such end carries a lever 30. The position of the latter is adjustable by a screw 31 which has right and left hand threaded portions engaging, respectively, in one end of lever 30 and a lug 32 on slide 28. The other end of the lever carries a pawl 33 to engage ratchet 29 and a spring 34 holds the pawl in engagement with the latter. The ratchet 29 is driven through bevel-gears 35 from one of the driven shafts 36 of the coating machine. Consequently, the lever 27 may be reciprocated and caused to periodically tap the edge of the belt $l$ for the purpose described, the degree of tap imparted being variable by adjustment of screw 31.

Referring now particularly to the decorating apparatus, a simple means of supporting and driving the flexible decorating units $a$ is shown in Figs. 17 and 18. These units, which are preferably, although not necessarily, endless, are mounted in axially spaced relation on a drum 40, which is rotatably supported at one end in a bracket 41 and carries a sprocket 42, by means of which it may be driven from a similar sprocket (not shown) on one of the driven shafts, as $z$ (Fig. 1) of the coating machine. Bracket 41 has fixed thereto depending guide-rods 43 which are slidable vertically in a bracket 44, mounted on a side extension B of casing A. A screw 45, threaded into a lug on bracket 44 and disposed between the guide-rods 43, is engageable with the under side of the bracket 41 and serves when turned in one direction to lift the bracket 41 and, when turned in the opposite direction, to permit the latter to be lowered by its weight. This vertical adjustment of the elements $a$ relatively to belt $l$ is desirable in that it permits the proximity of the lower end of the loops of the units $a$ to the belt $l$ to be varied, and such variation varies the extent of engagement of the units with the confections $b$ as well as the duration of such engagement.

The bracket 44 is secured to member B by bolts 46 which extend through horizontal slots 47 in the bracket, and thus permit the latter, and elements $a$, to be moved longitudinally of the conveyor. This adjustment permits the flexible units $a$ to be moved toward or away from the coating means and thus allows the units to act on the coated confections at various intervals after the time of coating, and thus after the coating is in various degrees of plasticity.

In addition to these adjustments, provision is made for moving the flexible units $a$ transversely of the belt *l* to position them properly in relation to the shoulders 26 of the belt. With wide confections the units *a* would need to be moved further away from these shoulders 26 than with narrow confections, to cause the ornamentation to be centrally applied in the case of each. The units *a* are spaced longitudinally on drum 40 by a series of rings 48, arranged in pairs with one unit *a* between each pair. These rings are held frictionally on the drum 40 and may be driven to the right or left to effect the adjustment described, or other means may be provided for this purpose, as will later appear.

For the purpose of heating the flexible units *a*, various means may be provided and, as an illustrative example of one of the many ways of accomplishing this function, the following arrangement is disclosed. The drum 40 is made hollow and stationarily supported within its interior is an electrical heating unit 49. This heating unit is shown as supported by a bracket 50 secured to bracket 41. Preferably, means are provided for controlling the degree of heat imparted to drum 40 and thus to units *a*. To this end, the heating unit 49 may, for example, include a coil 51, one terminal of which is connected by a wire 52 to a source of electrical energy and the other terminal of which is connected by a wire 53 to one of a series of coil contacts 54. Between the terminals of coil 51, other wires, as 55, are tapped in at intervals, each leading to a different contact 54. A switch-blade 56 is connected at one end by a wire 57 to the source of electrical energy, and its other end may be moved into engagement with any of the contacts 54, whereby various portions of coil 51 may be rendered active and the degree of heat controlled. Any other analagous means for heating the units *a* may be employed as desired.

In order to apply additional coating material to the confections to be decorated, I provide an arrangement, such, for example, as that shown in Figs. 10 and 11, by means of which the pattern members of each unit *a* will receive a supply of coating and carry it to the confection. As shown, this arrangement includes a pan 60 supported from one of the walls of casing A and supplied with coating material by means of a pipe 61 (Fig. 1) leading from the main supply pipe *p*. An overflow trough 62 (Fig. 11) is provided on pan 60 to direct excess coating material downwardly between one edge of belt *l* and the adjacent frame B, such material being returned to the tank *n*, as will be evident from Fig. 1. Rotatably mounted in the end walls of pan 60 are two spaced rolls 63, and similarly mounted between the latter is a roll 64 which is partially submerged in the coating material in the pan. The flexible decorating units pass over one roll 63, under roll 64, and over the other roll 63, depending from the two rolls 63 in loop form and into close proximity to belt *l*. Each unit *a* will therefore pass through the coating material in pan 60, pick up some of this material and carry it to the confections on belt *l*.

For positioning the units *a* on the rolls 63, guides 65, arranged in pairs with one unit *a* between each pair, are used in place of the rings 48 heretofore described, but these guides are secured to the sides of pan 60 and are curved to partially encompass their rolls and lie closely adjacent thereto. Preferably, although not necessarily, all the rolls 63 and 64 are driven, as by a chain 66 from the drive roll *y* for belt *l*, as indicated in Fig. 1, each roll 63 and 64 being provided at one end with a sprocket as indicated at 67 in Fig. 11 in connection with roll 64.

The heating of the units *a* may be accomplished in much the same manner as already described in connection with Figs. 17 and 19. Each of the rolls 63 and 64 is made hollow with one end open to receive a heating unit. The heating unit is indicated at 68 and is shown as disposed within roll 64 with an extension protruding through the open end thereof, which extension is supported by a bracket 69 secured to an end wall of pan 60. The heating unit, so applied, serves also to heat the coating material in pan 60 as well as the flexible units *a*, but it may be moved into either of the rolls 63 or other similar heating units may be similarly applied to either or both rolls 63, if desired. The decorating apparatus may, as shown in Fig. 1, be enclosed, as by a hood C, pivoted to casing A, or otherwise mounted to permit convenient access to the apparatus when desired, and the heat from the usual heating apparatus provided in casing A may be sufficient to heat the units *a* to the desired degree for certain kinds of work.

The flexible decorating units *a* are adjustable longitudinally and transversely of belt *l* as well as toward and away from the belt, and these adjustments may, for example, be effected by shifting the pan 60 with the entire assembly of parts carried thereby. To this end, the pan 60 rests upon, and is slidable longitudinally and transversely of, two spaced supporting arms 70. Each arm has a vertical end extension 61 (see Fig. 10) in which is a horizontal slot 72 (Fig. 11). A screw 73 extends through each slot 72 and has one end pinned to a side of pan 60. Nuts 74 on screw 73 serve to move it together with pan 60 in either direction longitudinally of arms 70. The slots 72 permit transverse movement of pan 60 on arms 70. This latter movement is effected by a screw 75 which passes through a horizontal slot 76 in one arm 70 and threads into a lug 77 depending from pan 60. Collars 78, fixed to screw 75 and arranged one on each side of arm 70, prevent axial movement of screw 75, but permit the screw to move in slot 76, when pan 60 is moved by screw 73 to effect the longitudinal adjustment above-described. Each arm 70 is carried by the threaded intermediate portion of a rod 78, the ends of which are rotatably mounted in upper and lower spaced lugs 79 on a bracket 80 secured to casing A. A collar 81, fixed to rod 78, abuts the upper lug 79 and prevents vertical movement of the rod in one direction, the weight of parts carried by the rod being sufficient to avoid vertical movement in the other direction. Rotation of rod 78 raises or lowers arms 70 and with it the pan 60 and units $a$.

With each form of decorating apparatus described, I prefer to provide additional means arranged near the belt $l$ to guide the flexible units $a$ properly upon the confections $b$. As an example of one means for effecting this result, a cross-bar 85 is secured to and extends between the two frames B, overlying belt $l$ and disposed in fairly close proximity thereto. This cross-bar may desirably pass through the loops formed by units $a$, as shown in Fig. 1, for by so doing both sides of each loop may be guided by a single device mounted on the cross-bar 85. Mounted on the latter are a series of guides 86, one for each unit $a$. Each guide is centrally secured to cross-bar 85, as by a small bolt 87 which extends through a longitudinal slot 88 in the cross-bar to permit adjustment of the guide transversely of belt $l$. Each end of each guide 86 is forked to provide two spaced fingers between which one unit $a$ is guided.

The provision of the guides 86 close to the tops of the confections $b$ to be ornamented prevents to a considerable extent lateral movement of the units $a$, which might otherwise sometimes occur, since these units hang loosely in loop form. It is particularly important where the units $a$ are made up of a series of reticulated pattern members for any one pattern member deposited on a confection, or on belt $l$, at an angle from its intended position tends to deflect the other members of the unit out of the path desired.

The operation of the apparatus in its various forms will be apparent from the foregoing description, and the operation of the apparatus, in the form shown in Fig. 1 only, will be briefly summarized. Confections are supplied to belt $k$, fed thereby into the machine and transferred to the coating belt $l$, which carries them under the shower pan $m$ and over the bottoming rolls $r$, whereby they are completely coated or enveloped. Continued travel brings the confections in under the nozzle $s$, from which issues a blast of air for the purpose described. The belt tapper 27 operates against one side edge of belt $l$ to cause the coated confections to slide down the inclined portions 25 of belt $l$ and bring up against the shoulders 26, in which positions they are alined properly with the decorating units $a$. These units, which are preferably moved at a linear speed equal, or substantially equal, to that of belt $l$, are laid upon the confections in the same manner as described in connection with the method steps. The endless, flexible unit, made up of a series of reticulated patterns, hanging loosely downward and moving in an endless path, are laid upon the confections much in the same manner as an endless traction belt of a tractor lays itself over the obstructions and inequalities of the ground upon which is travels, and in this sense the series of patterns may be termed "self-laying", and the decorations, formed according to the preferred embodiment of the invention, may be said to be produced by endless, self-laying series of pattern members.

I believe myself to be the first to decorate confections and the like by the method and by the apparatus heretofore described, and I desire to claim the same in the broadest possible legal manner.

What I claim is—

1. The method of decorating coated confections, which consists in flexibly laying patterns or designs upon the confections while the coating is workable, in allowing the patterns to remain in contact with the confections for a short interval, and in then gradually lifting the patterns to draw out portions of the coating into a decoration.

2. The method of decorating confections after their manufacture has been otherwise completed and while their outer portions are soft enough to be workable, which consists in engaging the confection near one end with a pattern member, in gradually laying the member over the confection beginning near said end and continuing toward the opposite end, and in lifting the member first from the first-named end and continuing toward the second end.

3. The method of decorating confections after their manufacture has been otherwise completed and while their outer portions are soft enough to be workable, which consists in engaging the confection with a portion of a flexible series of pattern members and then laying the members progressively over that part of the confection to be decorated, and in thereafter removing such portion to form the decoration.

4. The method of making decorative tracks in chocolate covered confections which consists in applying a pattern to the confection so that it is progressively engaged with the plastic covering thereof and after substantial engagement lifting the pattern.

5. The method of decorating confections, which consists in gently laying a suitable pattern member upon the confection after its manufacture has been otherwise completed and allowing it to remain thereon without relative movement for a short interval, and in thereafter removing the pattern member to form the decoration and in moving the pattern and the confection the one relatively to the other in a lateral direction during the removal of said member.

6. The method of decorating confections while in motion, which consists in laying a pattern member upon the moving confection, while its outer portion is soft and workable, in allowing the latter to remain on the confection without relative movement for a short interval to obtain adherence, and in then lifting the pattern from the confection to draw out portions of the confection into an ornamentation.

7. The method of decorating confections while in motion, which consists in laying a pattern member upon the moving confection while its outer portion is soft and workable and without relative motion, when in contact, between the confection and said member with respect to the direction of motion of the former, in allowing said member to remain on the confection for a short interval to obtain adherence and in then lifting the pattern from the confection to draw out portions of the confection into an ornamentation.

8. The method of decorating confections while in motion on a carrier and after their manufacture has been otherwise completed but while their outer portions are soft enough to be workable, which consists in so holding a flexible unit of pattern members that a loop depends toward the carrier and into the path of the confection, and in moving the unit in its loop path at a linear speed substantially equal to that of the confection carrier so that one side of the loop is laid down upon the confection during its travel while the other is lifted therefrom.

9. The method of decorating confections while in motion on a carrier and after their manufacture has been otherwise completed but while their outer portions are soft enough to be workable, which consists in so holding a flexible unit pattern member that a loop depends toward the carrier and into the path of the confections in moving the unit in its loop path at a linear speed substantially equal to that of the confection carrier so that one side of the loop is laid down upon the confections during their travel while the other is lifted therefrom, and in heating said unit prior to its engagement with the confections.

10. The method of decorating coated confections, which consists in gently applying a pattern to the coating while in a plastic state, in lifting the pattern from the coating after a substantial interval of contact therewith, and in producing a relative lateral movement between the confection and pattern during the removal of the latter.

11. The method of decorating confections while in a plastic state which consists in rolling out upon the plastic portions of the confections a chain, leaving a portion of the reticulated elements of the chain in engagement with and supported by such portions long enough to leave permanent tracks, and then rolling the chain off the confections.

12. The method of decorating coated confections which consists in laying a pattern on and in the coating while the latter is in plastic condition, raising the pattern from depth contact with the coating to thereby project a decorative figure in relief from a base corresponding substantially to the regular outline of the pattern in contact, and as said pattern is raised from such contact shifting it in one general transverse direction to thereby pull the decorative figure into a substantially irregular form and progressively offset said form as it rises from its base.

13. The method of decorating confections, which consists in applying coating material to a pattern member, in laying such member upon the confection and allowing it to remain thereupon for a short interval, and in thereafter removing the pattern member to form the decoration.

14. The method of making decorative tracks or patterns on confections which consists in applying plastic material to the track forming means and then resting them on the confection step by step and after substantial engagement with the confection lifting the track forming means.

15. The method of decorating confections, which consists in heating a suitable pattern member, in applying coating material thereto, in then laying said member upon the confection and allowing it to remain thereon for a short interval, and in thereafter removing the pattern member to form the decoration.

16. The method of decorating confections while their outer portions are soft enough to be workable, which consists in so holding a flexible decorating unit as to form a depending loop, in effecting a relative bodily shifting movement between the confection and loop to bring them into engagement and at the same time moving the unit in the path of its loop at a linear speed substantially equal to that of said first named movement, so that one side of the loop is laid down on the confection during its travel while the other is lifted therefrom, and in applying coating material to the unit prior to its engagement with the confection.

17. The method of decorating confections while their outer portions are soft enough to be workable, which consists in so holding a flexible decorating unit as to form a depending loop, in effecting a relative bodily shifting movement between the confection and loop to bring them into engagement and at the same time moving the unit in the path of its loop at a linear speed substantially equal to that of said first named movement, so that one side of the loop is laid down on the confection during its travel while the other is lifted therefrom, and in heating said unit and applying coating material to the unit prior to its engagement with the confection.

18. A confection decorating apparatus, comprising, a carrier for the confections, and a chain for decorating the same mounted so that a plurality of its links may rest upon and be temporarily supported by the plastic covering of the confections.

19. A confection decorating apparatus, comprising, a support for the confections, a chain to decorate the same, and means to roll the chain on and off the plastic covering of the confections.

20. A confection decorating apparatus, comprising, a support for the confections, a chain to decorate the same, and means to roll the chain on the plastic covering of the confections so as to have its engaged links supported by such covering and to then roll it off the covering.

21. A device for decorating confections, comprising, a flexible reticulated track or series of pattern members each of which is comparable in width to the confections, said members adapted to be rolled out upon the confections and then rolled off the confections, and the portion in engagement with the confections arranged to be supported entirely by the confections.

22. Apparatus for decorating confections, comprising a support for the confections, a flexible decorating unit comparable in width to that of the confections, a support for the latter from which said unit depends in loop form into such proximity with the confection support as to engage the confections on longitudinal movement of the confections relative to the second support, means to effect said relative movement, and means to move said unit in its loop path.

23. Apparatus for decorating confections, comprising a support for the confections, a flexible decorating unit comparable in width to that of the confections, a support for the latter from which said unit depends in loop form into such proximity with the confection support as to engage the confections on longitudinal movement of the confections relative to the second support, means to effect said relative movement, means to move said unit in its loop path, and means to heat said unit.

24. Apparatus for decorating confections, comprising a support for the confections, an endless flexible decorating unit, a support for the latter from which said unit depends in loop form into such proximity with the confection support as to engage the confections upon longitudinal movement of the confections relative to the second support, means to effect said relative movement, and means to move said unit in a closed loop path.

25. Apparatus for decorating confections, comprising, a support for the confections, an endless flexible decorating unit, a support for the latter from which said unit depends in loop form into such proximity with the confection support as to engage the confections upon longitudinal movement of the confections relative to the second support, means to effect said relative movement, and means to move said unit in a closed loop path at a linear speed substantially equal to that of said relative movement.

26. Apparatus for decorating confections, comprising, a support for the confections, an endless flexible decorating unit, a support for the latter from which said unit depends in loop form into such proximity with the confection support as to engage the confections upon longitudinal movement of the confections relative to the second support, means to effect said relative movement, means to move said unit in a closed loop path, and means to heat said unit during its travel.

27. Apparatus for decorating confections, comprising, conveying means for the confections, a flexible decorating element comparable in width to the confections mounted above said means and depending in loop form toward the latter and into such proximity thereto as to engage the confections during their travel, and means to move said element in a loop path.

28. Apparatus for decorating confections, comprising, in combination with conveying means for the confections, a flexible self-laying decorating unit mounted to successively engage confections during their travel.

29. Apparatus for decorating confections, comprising, in combination with conveying means for the confections, an endless flexible self-laying decorating unit mounted to successively engage confections during their travel.

30. Apparatus for decorating confections, comprising, in combination with conveying means for the confections, an endless flexible decorating unit movable simultaneously with the conveying means and arranged to successively engage confections during their travel.

31. Apparatus for decorating confections, comprising in combination with confection-conveying mechanism, rotary means mounted above said mechanism, and an endless flexible decorating unit mounted upon and driven by said means and depending therefrom toward the conveying mechanism.

32. Apparatus for decorating confections, comprising, in combination with confection-conveying mechanism, rotary means mounted above said mechanism, and an endless flexible decorating unit mounted upon and driven by said means and depending therefrom toward the conveying mechanism, and means to heat said unit during its travel.

33. Apparatus for decorating confections, comprising, in combination with confection-conveying means, an endless flexible decorating unit mounted above said means and depending toward the latter sufficiently to engage the confections during their travel, and means to move said unit at a linear speed approximately equal to that of said means.

34. Apparatus for decorating confections, comprising, in combination with confection-conveying means, a hollow rotatable element mounted above said means, an endless flexible decorating unit engaging said element and depending toward the conveying means, and heating means mounted within said element.

35. Apparatus for decorating confections, comprising, in combination with confection-conveying mechanism, rotary means above said mechanism, a plurality of flexible and endless series of decorating members mounted upon said means and depending therefrom toward the conveying mechanism, and guiding means associated with the first named means to maintain said members properly spaced transversely of the conveying mechanism.

36. Apparatus for decorating confections, comprising, a support for the confections, a flexibly connected series of decorating members each of which is not greatly different in area than the confections, spaced supports for the latter from which said members depend in loop form into such proximity with the confection support as to engage the confections on longitudinal movement of the latter relative to said spaced supports, means to effect said relative movement, and means to move said members in their loop path, said spaced supports being movable the one relatively to the other to vary the curvature of the depending loop formed by said members.

37. Apparatus for decorating confections, comprising, a support for the confections, an endless flexibly connected series of decorating members each of which is not greatly different in area than the confections mounted above said support, spaced rolls supporting and driving said members and movable toward and away from one another so that said members in their lower lap of travel may assume loop paths of various curvatures, and means to effect a relative longitudinal movement between the confection support and said rolls.

38. In combination with a confection coating machine, a device for making decorative tracks or patterns on the coated confections, comprising, a series of reticulated track making members of small individual area compared to the confections to be decorated but heavy enough to sink into the chocolate when the latter is in a plastic condition for the decorating operation.

39. In combination with a confection coating machine, a device for making decorative tracks or patterns on the coated confections, comprising, a chain, the links of which are heavy enough to sink into the chocolate when in condition for permanent decoration.

40. In combination with a confection coating machine, a chain for decorating confections, comprising, links heavy enough to sink into the surface of the confections when resting thereon after the confections have been otherwise completely manufactured and while the surface still remains plastic.

41. In combination with a confection coating machine, a chain for decorating confections while passing from a chocolate coating machine, the links of said chain being small enough to engage only a portion of the surface to be decorated.

42. A confection decorating apparatus, comprising, a carrier for the confections, a chain mounted therein so that a plurality of its links may rest upon and be supported by the confections, and means to apply coating material to said chain prior to its engagement with the confections.

43. In combination, a chocolate coating machine for confections, a decorating device consisting of a chain mounted to engage the confections only after they have been coated and while the coating is still plastic, and means to roll the chain on the coating so as to be supported by the confections and then roll the chain off the coating after it has sunk therein sufficiently to leave permanent marks of decoration.

44. Apparatus for decorating confectionery, comprising, a support for the confections, a flexible decorating unit, a support for the latter from which said unit depends in loop form into such proximity with the confection support as to engage the confections on longitudinal movement of the confections relative to the second support, means to effect said relative movement, and means to apply coating material to said unit prior to its engagement with the confections.

45. Apparatus for decorating confections, comprising, a support for the confections, an endless flexible decorating unit, a support for the latter from which said unit depends in loop form into such proximity with the confection support as to engage the confections upon longitudinal movement of the confections relative to the second support, means to effect said relative movement, means to move said unit in a closed loop path, and means to apply coating material to said unit during its travel and prior to its engagement with the confections.

46. In combination, means to coat confections, conveying means therefor, and a flexible series of self-laying pattern members mounted to engage the confections only after they have been coated and while their coating is soft enough to be workable.

47. In combination, means to coat confections, conveying means therefor, a flexible series of self-laying pattern members each comparable in width to the confections mounted to engage the coated confections while their coating is soft enough to be workable, and means to apply additional coating material to said members.

48. In combination, means to coat confections, conveying means therefor, a flexible series of self-laying pattern members each comparable in width to the confections mounted to engage the coated confections while their coating is soft enough to be workable, and means to heat the pattern members.

49. In combination, confection-conveying means, means to coat the confections while on said means, a series of flexible decorating units mounted to engage the freshly coated confections while on said means, and means for aligning the coated confections with said units.

50. In combination, confection-conveying means, means to coat the confections while on said means, and a series of endless chains movable with the conveying means and mounted in such proximity thereto as to engage the freshly coated confections during their travel.

51. In combination, confection-conveying means, means to coat the confections while on said means, and a series of endless chains movable simultaneously with the conveying means and mounted in such proximity thereto as to engage the freshly coated confections during their travel and be laid up, over and across the latter.

52. Apparatus for decorating confections, comprising, in combination with confection-conveying means, a rotatable element mounted above said means, an endless flexible decorating unit engaging and driven by said element and depending toward the conveying means, and means to supply coating material to said unit prior to its engagement with the confections.

53. Apparatus for decorating confections, comprising, in combination with confection-conveying means, a rotatable element mounted above said means, an endless flexible unit mounted upon said element and depending therefrom toward said means, a receptacle for coating material, and guiding means to direct said unit into said receptacle.

54. Apparatus for decorating confections, comprising, confection-conveying means, a flexible decorating unit of a width comparable to that of the confections mounted to present a depending loop in the path of the confections, and means for moving said unit toward and away from said means to vary the proximity of said loop thereto.

55. Apparatus for decorating confections, comprising, confection-conveying means, a flexible decorating unit mounted to present a depending loop in the path of the confections, and means for moving said unit transversely of said means for alining it with the path of travel of the confections.

56. In combination, confection-conveying means, means for coating the confections carried by said means, a flexible decorating unit mounted to present a depending loop in the path of the confections, and means for moving said unit toward and away from said coating means.

57. Apparatus for decorating confections, comprising, confection-conveying means, a flexible decorating unit mounted to present a depending loop in the path of the confections, and means for moving said unit longitudinally of said conveying means.

58. Apparatus for decorating confections, comprising, confection-conveying means, a flexible decorating unit mounted to present a loop portion depending into proximity to said means and in the path of the confections, means to move said unit in its loop path, and guiding means adjacent said conveying means to direct said unit upon the confections.

59. Apparatus for decorating confections, comprising, confection-conveying means, a flexible decorating unit mounted to present a loop portion depending into proximity to said means and in the path of the confections, means to move said unit in its loop path, and means arranged near the conveying means for preventing any substantial sidewise movement of the loop.

60. Apparatus for decorating confections, comprising, confection-conveying means, a flexible decorating unit mounted to present a loop portion depending into proximity to said means and in the path of the confections, means to move said unit in its loop path, and means adjustable transversely of and arranged near the conveying means for preventing any substantial sidewise movement of the loop.

61. Apparatus for decorating confections, comprising, confection-conveying means, a flexible decorating unit mounted to travel downwardly toward and into close proximity to the conveying means and then upwardly away from the latter, and guiding means arranged close to the conveying means to direct said unit in its downward travel.

62. Apparatus for decorating confections, comprising, confection-conveying means, a flexible decorating unit mounted to travel downwardly toward and into close proximity to the conveying means and then upwardly away from the latter, and guiding means arranged close to the conveying means to direct said unit in its upward travel.

63. Apparatus for decorating confections, comprising, confection-conveying means, a flexible decorating unit mounted to travel downwardly toward and into close proximity to the conveying means and then upwardly away from the latter, and guiding means arranged close to the conveying means to direct said unit in its downward and upward travel.

64. Apparatus for decorating confections, comprising, in combination with confection-conveying means, a rotatable element above said means, a series of endless flexible decorating units mounted upon said element and depending therefrom toward the conveying means, and means for moving said element toward and away from the conveying means.

65. Apparatus for decorating confections, comprising, in combination with confection-conveying means, a rotatable element above said means, a series of endless flexible decorating units mounted upon said element and depending therefrom toward the conveying means, and means for moving said element longitudinally of the conveying means.

66. Apparatus for decorating confections, comprising, in combination with confection-conveying means, a rotatable element above said means, a series of endless flexible decorating units mounted upon said element and depending therefrom toward the conveying means, and means for moving said element transversely of the conveying means.

67. Apparatus for decorating confections, comprising, a support for the confections, a plurality of series of flexibly connected decorating members, supporting means therefor from which said members depend in loop form into such proximity with the confection support as to engage the confections on longitudinal movement of the latter relative to said supporting means, means to effect said relative movement, means to move said members in their loop path, whereby some of said members will be brought into contact with the confections for an interval during said relative movement, and means for effecting variations of said contact interval.

In testimony whereof I have affixed my signature.

ALONZO LINTON BAUSMAN.